March 6, 1928.
F. G. NICOLAUS
1,661,845
GAS RANGE VALVE AND OPERATING MEMBER THEREFOR
Original Filed May 8, 1926  3 Sheets-Sheet 1
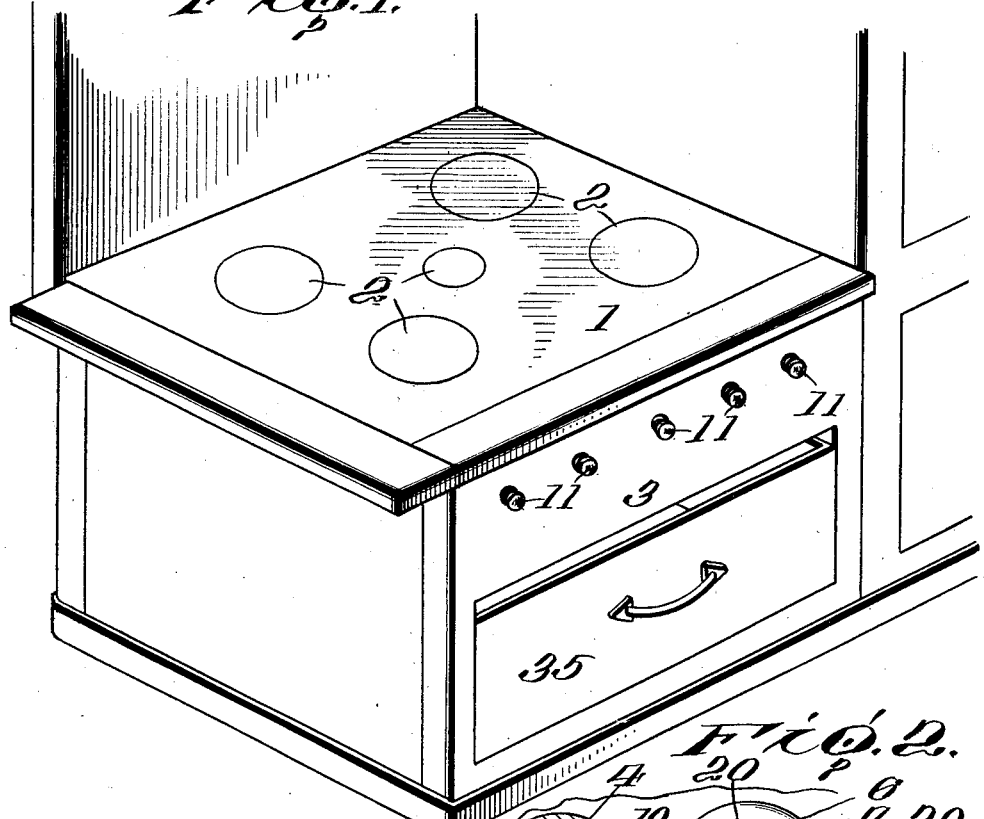
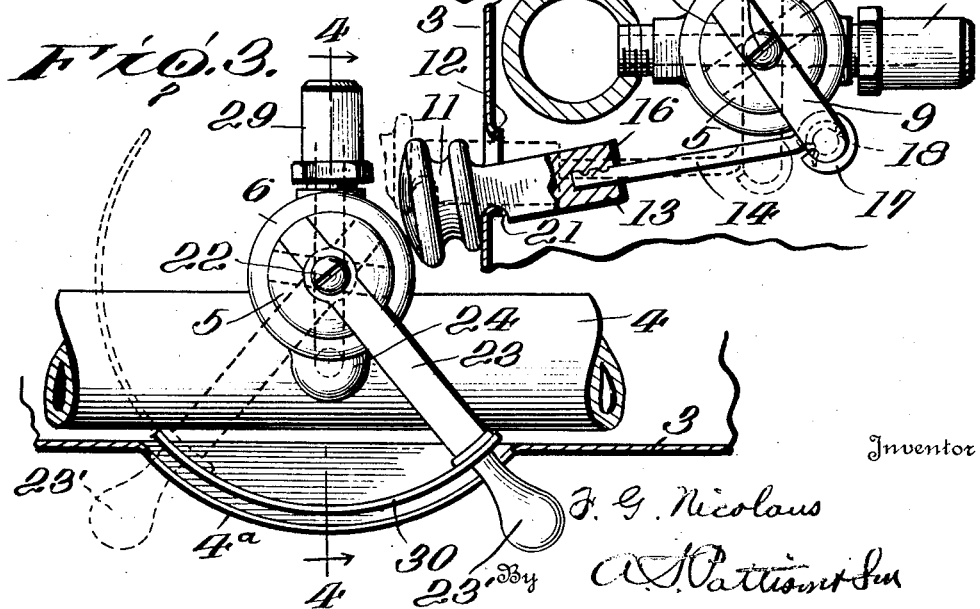
Inventor
F. G. Nicolaus
By A. S. Pattison Sr.
Attorney March 6, 1928.  F. G. NICOLAUS  1,661,845
GAS RANGE VALVE AND OPERATING MEMBER THEREFOR
Original Filed May 8, 1926  3 Sheets-Sheet 2
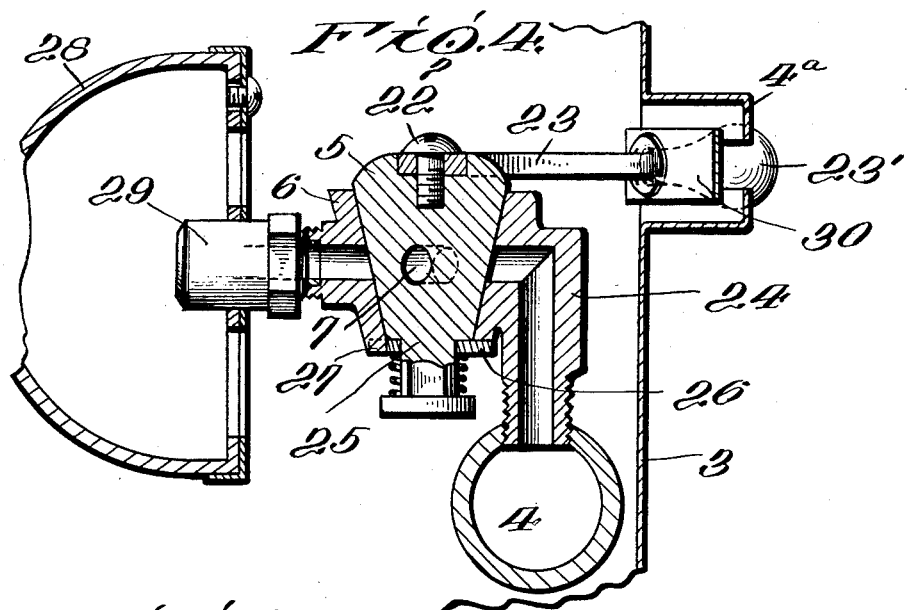
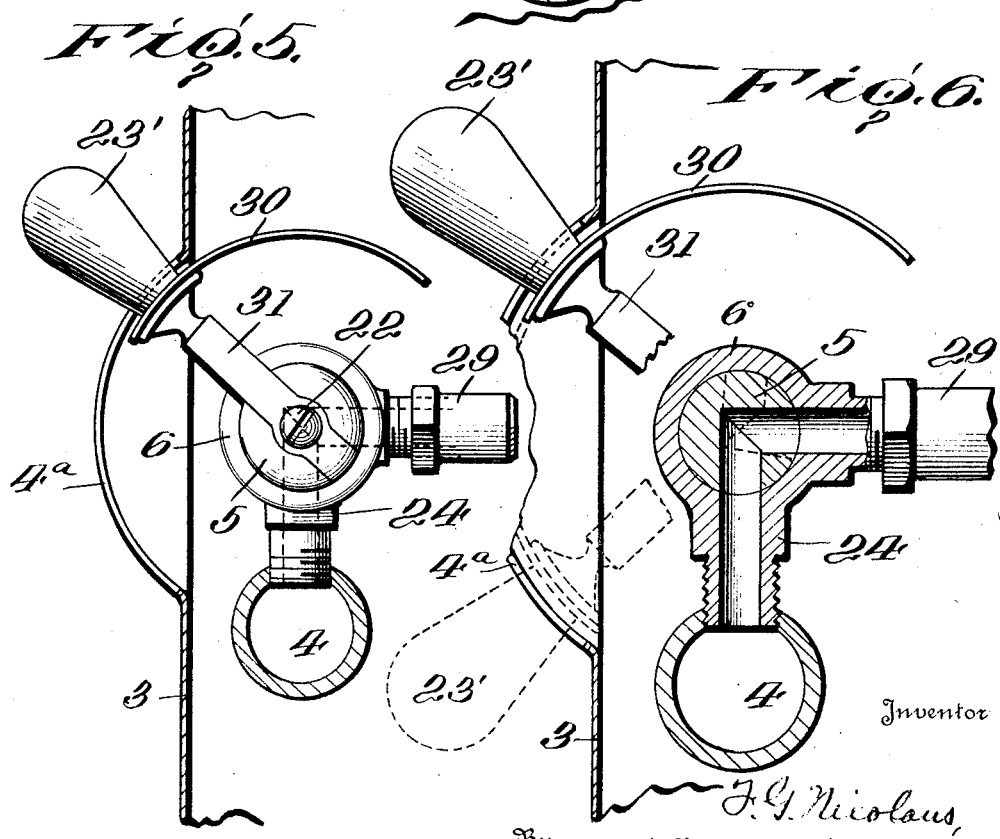
Inventor
F. G. Nicolaus,
By A. S. Pattison Fox
Attorney

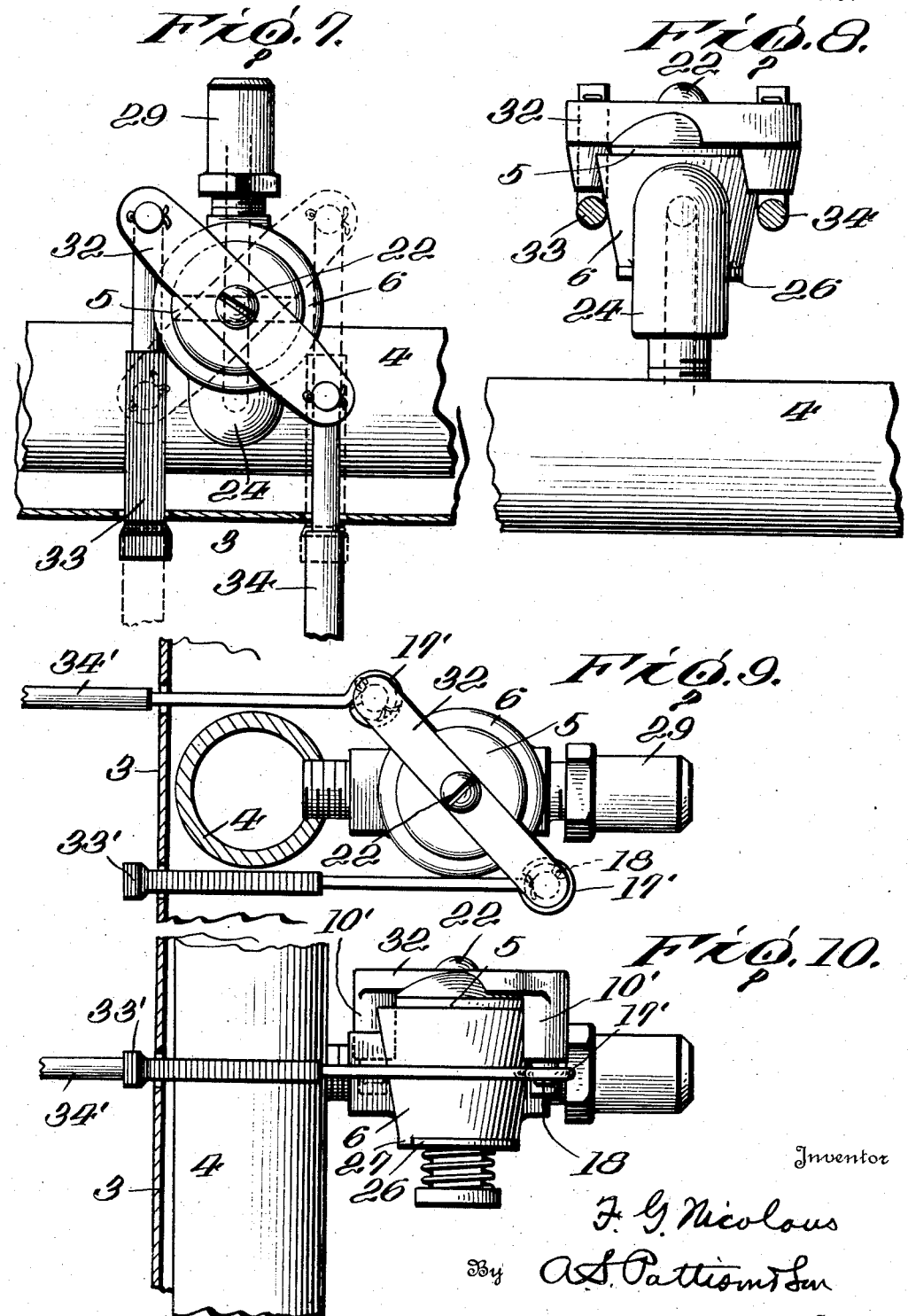

Patented Mar. 6, 1928.

1,661,845

UNITED STATES PATENT OFFICE.

FREDERIC G. NICOLAUS, OF CLEVELAND, OHIO, ASSIGNOR TO AMERICAN STOVE COMPANY, OF ST. LOUIS, MISSOURI, A CORPORATION OF NEW JERSEY.

GAS-RANGE VALVE AND OPERATING MEMBER THEREFOR.

Application filed May 8, 1926, Serial No. 107,672. Renewed December 3, 1927.

This invention relates to improvements in gas range valves and operating members therefor and its function is to construct an easily movable valve that is attached to a concealed manifold, whereby the easily movable valve is operable by means of a handle extending through the front of the range to the concealed valve.

Gas range valves as known to me, have heretofore consisted of a relatively long gradually tapered valve having a handle directly connected therewith. A valve so constructed is not adapted to be moved by a handle extending through the front of the range and connected with the valve. These valves heretofore constructed have been made three times as long as their diameter, thereby making them so hard to move that they are not adapted to be operated as hereinafter defined.

My improved valve to the contrary is composed of a short truncated cone shape which I have discovered moves freely and easily whereby it is adapted to be operated by a handle extending through the front of the range and having its inner end connected with the valve.

My improved valve, therefore, is a truncated cone valve having an abrupt taper as compared with the long and gradual taper of gas range valves as heretofore constructed. My full size valve has its largest part one inch in diameter while its full length is also one inch, thereby greatly increasing the friction surface as compared with the ordinary gas range valve. I find, however, that contrary to the expected theory it moves perfectly free and easy, making it adapted to be operated by a member passing through the closed face of the range and having its inner end connected therewith.

Because of the ease of movement of my truncated cone valve, several forms of handles and manner of connecting them with the valve may be utilized. However the preferred form consists of a push and pull handle, though I have shown herein other forms.

In the accompanying drawings:

Figure 1 is a perspective view showing that part of a range usually referred to as the open burner part, and the handles for operating the valves.

Figure 2 is a view partly in section, showing the form of handle that is illustrated in Figure 1, and the valve full sized, and the manner of connecting it with the valve.

Figure 3 is a top plan view showing my improved full size valve and having a handle that swings horizontally.

Figure 4 is an enlarged sectional view of Figure 3.

Figure 5 is a view showing the valve in full size and connected in a different manner with the manifold, and having its handle swing vertically.

Figure 6 is a sectional view of Figure 5.

Figure 7 is a top plan view of my improved valve showing push buttons connected with the valve.

Figure 8 is a top elevation of Figure 7.

Figure 9 is a view partly in section, also showing push buttons for controlling its position.

Figure 10 is a top plan view of Figure 9.

I have shown part of a range in Figure 1, in which the numeral 1 is what is usually termed the open burner top of the range. This does not show the several burners but they are usually located in the positions which are shown by the circles 2. This part of the range in may improvement has its face 3 closed, and located within this closed face is a manifold 4. This manifold, therefore, is concealed from the outside of the range. My improved truncated cone valve 5 is in a correspondingly shaped housing 6, and the valve in the form shown in Figure 2 has its valve provided with an opening 7 that extends through it, the said opening 7 adapted to register with an opening in the housing 6, as will be readily understood.

The preferred construction for operating my improved valve consists in attaching to its large end or top a lever 9, the said lever having its end extending beyond the housing 6 and then inward as at 10, to a position over the center of the valve as shown at 10′ in Figure 10. The handle 11 extends through an opening 12 made in the closed front 3. This handle has a suitable extension 13 into which the outer end of a rod 14 is cast. Preferably this handle and its extension 13 are composed of bakelite, and the end of the rod 14 is notched as at 16 for the purpose of making its connection with the handle 13 in a manner to prevent its dislodgment. A loop 17 is provided on its inner end that passes around the part 10 and then a cotter pin 18 passes through the outer extremity of the part 10, thereby holding the looped inner end of the rod 14 in position. The lever 9 passes in a slot 19 formed in the outer face of the valve 5 and a screw 20 serves to hold the lever to the valve.

With the parts in the position shown in Figure 2, the notched portion 21 of the extension 13 engages the edge of the opening 12, whereby the handle must be lifted in order that it can be readily pulled outward. With the valve in the position shown in the said figure, it is closed, and when the handle 11 is lifted and pulled outward, the valve is open.

By means of having the extension 10' on the lever 9, the rod 14 is substantially in a line with the center of the housing 6 and therefore valve 5 whereby the pull and push of the rod is prevented from having any side lash on the valve, thereby tending to cause a side wear. This arrangement of the parts serves to make the valve move more easily as well as to prevent the uneven wear of the valve.

As stated in the early part of this specification, my valve is adapted to have several forms of handles connected therewith, and these forms will now be referred to.

In Figure 3 I have shown the closed face 3 with an outward bulge 4 that forms part of a circle having the screw 22 forming its center. In this form the lever 23 extends across the valve and has its end 24 passing through a slot made in the curved part 4, whereby the handle is adapted to be moved right and left. When the handle 24 is at the right of Figure 3, the valve is closed and when it is in the left hand position shown in dotted lines, the valve then is open. In this view the end 24 that is connected with the manifold 4 is in the form of a downward extension instead of a straight way extension as shown in Figure 2.

The valve 5 has its lower end 25 provided with the usual stop washer 26 that is constructed to engage a stop 27 projecting from the valve housing 6. The valve in Figure 4 though an enlarged sectional view, is the same valve as shown in Figure 3, and the opening through the valve is the same also as Figure 2. In Figure 4 I have shown the ordinary housing 28 that forms the usual mixing chamber, into which the adjustable nipple 29 projects.

For the purpose of closing the slot in the bulged portion 4 I provide a shield 30 that has one end connected with the handle 24 and has a curve corresponding to the bulged portion 4 and it will fit fairly close to the bulged portion. Therefore when the valve is in the closed position this slot is closed, protecting the parts lodged within the face 3 of the range.

Figure 5 is a view showing a handle 31 that moves back and forth vertically instead of horizontally as shown in Figures 3 and 4. The parts are otherwise just the same as Figures 3 and 4 and any explanation of this is unnecessary.

Figure 6 is an enlarged sectional view of Figure 5 and the same reference letters applied thereto.

In Figure 7 I have shown the valve constructed exactly as heretofore described. This figure, however, shows the lever 32 extended to both sides of the valve, one end of the lever having the inner end of the handle 33 connected thereto, the said handle preferably being red, though it may be white. To push in on this handle means that the valve is open. A handle 34 is connected to the opposite end of the lever 32, and this handle will preferably be black, meaning that when it is pushed the valve is closed.

Figure 8 is a side elevation of Figure 7 so that the reference characters are the same in that view.

Figures 9 and 10 show respectively side view and a plan view. These show push buttons 33' and 34' operating the same as in Figure 7. In these views, however, the valve is connected to the manifold in a different position and the push buttons are located respectively above and below the manifold. Also in these views the ends are provided with loops 17' similar to those shown in Figure 2.

Valves for gas stoves and ranges heretofore used and known to me consisted of elongated gradually tapering valves, in which the large end of the valve was at most one-third of the length of the taper of the valve, making it a valve relatively hard to operate. I have found it wholly unsuitable to my present invention which involves a member passing through the vertical wall of the stove or range and having its inner end connected with the valve for operating it. I find by making the valve and its housing short and stumpy with an abrupt, short taper that it has a free movement in the housing and is especially adapted to be operated by a member passing through a wall and having its inner end connected therewith. I have discovered that a valve made with its thickest portion having a diameter substantially equal to the length of the valve makes an easy and free moving valve that makes a gas-tight closure with the housing.

All of the valves herein shown are constructed alike, and all of them are provided with the well known locking washer 26.

In Figure 1 the lower front part 1 of the range is closed by a movable drawer 35. However this construction may be changed without departing from the invention.

From the foregoing description, it will be understood that slight changes may be made in the construction without departing from the invention, so long as those changes do not vary substantially the operation of the parts, and so long as the changes are within a fair scope of the appended claims.

Having thus described my invention, what I desire to secure by Letters Patent and claim is:

1. A gas stove having a closed structure, a burner and a manifold both embraced within the said structure, the manifold having a valve housing provided with an abrupt taper, a valve correspondingly shaped and fitting the said taper, a lever having its inner end rigidly connected with the valve, said lever projecting through a slot formed in the said housing, the said valve being thus subjected to the heat from the burner, the parts operating as described.

2. A gas stove comprising a closed housing, a burner and a manifold enclosed within said housing, the manifold having a valve housing also within the said housing, the valve housing having an abrupt taper, a valve being correspondingly shaped and having one end extending from the valve housing and carrying a spring for holding the valve therein, and a lever rigidly connected to the opposite end of the said valve, the said lever projecting through a slot made in the wall of said housing, the parts adapted to operate as described.

3. A gas stove comprising a closed housing, a burner and a gas manifold enclosed within the housing, said manifold having an abrupt tapered valve housing located also within the said stove housing, and a lever having its inner end rigidly connected with one end of the said valve and its opposite end passing through a vertical slot formed in said housing, the projected end forming a handle, the parts operating as specified.

In testimony whereof I hereunto affix my signature.

FREDERIC G. NICOLAUS.